(12) United States Patent
Johannesson

(10) Patent No.: US 6,216,772 B1
(45) Date of Patent: Apr. 17, 2001

(54) DEVICE FOR FILTERING AND COOLING

(75) Inventor: Stig-Erik Johannesson, Kungälv (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/269,247

(22) PCT Filed: Aug. 21, 1997

(86) PCT No.: PCT/SE97/01375

§ 371 Date: Jun. 1, 1999

§ 102(e) Date: Jun. 1, 1999

(87) PCT Pub. No.: WO98/13644

PCT Pub. Date: Apr. 2, 1998

(30) Foreign Application Priority Data

Sep. 24, 1996 (SE) .................................................. 9603483

(51) Int. Cl.[7] .................................................. F28F 13/12
(52) U.S. Cl. .................. 165/119; 165/DIG. 916; 165/51; 123/196 AB; 184/104.3
(58) Field of Search .................. 165/119, 916, 165/51; 210/184, 186; 184/104.3, 6.24; 123/196 AB, 41.33

(56) References Cited

U.S. PATENT DOCUMENTS

| | | | |
|---|---|---|---|
| 2,713,422 | * | 7/1955 | James .................................. 165/119 |
| 2,730,083 | * | 1/1956 | Kremser .............................. 165/119 |
| 2,834,469 | * | 5/1958 | Mitterer .............................. 165/119 |
| 4,831,980 | * | 5/1989 | Nasu et al. ...................... 123/196 AB |
| 5,014,775 | * | 5/1991 | Watanabe .............................. 165/51 |
| 5,032,259 | * | 7/1991 | He et al. ........................ 123/196 AB |
| 5,476,139 | * | 12/1995 | Gire .................................... 165/119 |
| 5,520,800 | * | 5/1996 | Glebovsky et al. .......... 123/196 AB |
| 5,718,281 | * | 2/1998 | Bartalone et al. .................... 165/119 |
| 5,975,245 | * | 11/1999 | Jephott et al. .................... 184/104.3 |

FOREIGN PATENT DOCUMENTS

| | | |
|---|---|---|
| 2 082 464 | 3/1982 | (GB) . |
| 2 163 967 | 3/1986 | (GB) . |
| 96/06353 | 8/1996 | (WO) . |

* cited by examiner

*Primary Examiner*—Ira S. Lazarus
*Assistant Examiner*—Terrell McKinnon
(74) *Attorney, Agent, or Firm*—Lerner, David, Littenberg, Krumholz & Mentlik, LLP

(57) ABSTRACT

Apparatus is disclosed for treating liquid lubricant in a supply of lubricant such as a gearbox including a filter, an inlet for supplying the lubricant to one side of the filter, and through the filter into a cavity, a lubricant cooler downstream pf the cavity so that the lubricant can pass from the cavity through the lubricant cooler for cooling, an outlet for the treated lubricant, a connector for transporting the lubricant from the lubricant cooler to the outlet, with the connector being disposed within the cavity.

12 Claims, 1 Drawing Sheet

DEVICE FOR FILTERING AND COOLING

FIELD OF THE INVENTION

The present invention relates to apparatus for the filtration and cooling of a liquid medium. The present invention is particularly intended for use in the field of motor vehicles, in particular for the filtration and cooling of oil that is utilized for lubrication of a gearbox.

BACKGROUND OF THE INVENTION

In a manner which is well known, oil is used in the field of motor vehicles for lubrication of, for example, the vehicle gearbox. For purification of the oil, an oil filter is normally used, through which the oil is caused to flow. During filtration, contaminants (for example in the form of solid particles) in the oil are separated from the liquid phase. The reason for this is that the oil is caused to pass through a porous layer in the oil filter, by means of which the contaminants remain in that layer.

For filtration of oil in the gearbox of a heavy goods vehicle, a so-called "spin-on-filter" is normally used, which is normally arranged on the outside of the gearbox and is connected to inlets and outlets for the oil that flows through the gearbox. The filter is constructed as a container, normally made of sheet metal, which contains an oil-filtering element in the form of a porous filtering material, through which the oil is fed. When the filter has been used for a period of time, it must be renewed, in which case the entire spin-on-filter is discarded and exchanged for a new filter. In this connection, the term "spin-on" refers to the fact that the filter-exchange is carried out by means of the filter being provided with a threaded portion, by means of which the filter can be screwed on directly during such an exchange.

Furthermore, in the case of trucks, there is in some cases also a need for cooling of the oil in the gearbox. In particular, such a need generally arises in countries having a warm climate, or in places where driving takes place in exceptionally exposed environments, for example in mines. According to known techniques, cooling of the oil is in this case carried out by means of an oil cooler being mounted between the gearbox pump and the oil filter. The oil that is utilized in the gearbox will thus be fed through the oil cooler, in which the oil is cooled down and is filtered in the oil filter. To this end, the oil cooler is provided with connections for an inlet and an outlet for a suitable refrigerant, for example water. In this case, the oil that is passing through the cooler can be cooled by the cooling water which is flushed through the cooler.

Although today's oil filters normally operate satisfactorily, they still have certain drawbacks. For example, the known type of spin-on-filter is not suitable to use due to environmental reasons, since the entire filter, including its casing, must be discarded when the filter must be renewed.

An additional drawback with this known technique is that the oil that is fed into the filter is relatively cold due to the fact that it has just passed through the cooler. Since cold oil is comparatively viscous, this provides for inferior flow through the oil filter. Furthermore, the oil that is fed through the oil cooler is contaminated, i.e. it is supplied directly from the gearbox and contains contaminants, for example in the form of particles. There is therefore a risk of these contaminants blocking the oil cooler, which can result in costly and undesirable breakdowns.

One of the objects of the present invention is thus to provide an improved device for cooling and filtration of a liquid medium, particularly oil, that is utilized in a motor vehicle, wherein the above-mentioned drawbacks are eliminated.

SUMMARY OF THE INVENTION

In accordance with the present invention, this and other objects have now been accomplished by the discovery of apparatus for treatment of a liquid lubricant in a supply of the lubricant comprising a filter having a first side and a second side, an inlet for supplying the lubricant from the supply of lubricant to the first side of the filter, whereby the lubricant can pass through the filter to the second side of the filter, the second side of the filter comprising a cavity, a lubricant cooler disposed downstream of the cavity, whereby the lubricant can pass from the cavity through the lubricant cooler for cooling therein, an outlet for the treated lubricant, and a connector for transporting the lubricant from the lubricant cooler to the outlet, the connector being disposed within the cavity. In a preferred embodiment, the connector comprises a detachable tube.

In accordance with one embodiment of the apparatus of the present invention, the apparatus includes a filter housing surrounding the filter, the filter housing adapted for mounting proximate to the supply of the lubricant, the lubricant cooler adapted for mounting on the housing distal from the supply of the lubricant, and the filter housing including at least one aperture for passing the lubricant from the filter to the lubricant cooler. In a preferred embodiment, the filter housing includes a tubular portion extending into the lubricant cooler, the tubular portion including at least one aperture whereby the cooled lubricant can pass from the lubricant cooler into the tubular portion. Preferably, the connector is detachably mounted within the tubular portion and at the outlet.

In accordance with another embodiment of the apparatus of the present invention, the filter is removably mounted within the filter housing.

In accordance with another embodiment of the apparatus of the present invention, the supply of lubricant includes a lubricant pump for pumping the lubricant to the inlet, the inlet including a passageway and a normally closed valve for selectively opening the passageway, whereby the normally closed valve is selectively opened when the pressure in the inlet exceeds a predetermined value. In a preferred embodiment, the passageway is in fluid communication with the supply of the lubricant.

In accordance with another embodiment of the apparatus of the present invention, a gear box for a vehicle has been discovered comprising the above apparatus, the liquid lubricant comprising oil flowing in the gear box.

The present invention is intended to be used for filtration and cooling of a liquid medium which preferably, but not exclusively, can constitute lubricating oil for a lubricated component, such as a gearbox. The present invention comprises an inlet for supply of the liquid medium to a filtering component, which defines a cavity to which filtered medium is guided. The present invention also comprises a cooling device and an outlet for supply of the medium back to the filtering component. A basic principle of the present invention is that the cooling device is arranged downstream of the cavity, wherein the cavity is connected to the cooling device and the cooling device is connected to the outlet. Due to the fact that the cooling device is arranged downstream of the filtering component, the entire amount of liquid medium will be filtered before it reaches the cooling device. Since the medium is filtered when it flows through the filtering device, there is basically no risk of contaminants accumulating and blocking the cooling device.

An additional advantage of the present invention is that it provides for an improved flow through the filtering component, which is due to the fact that the liquid medium is normally warm when it exits the gearbox and flows towards the filtering component. This, in turn, provides for an improved flow and an increased percolation through the filtering component, which in turn results in more effective filtration.

According to one embodiment of the present invention, the filtering component is arranged as a detachable part in a protector for the filter; i.e., the filtering component constitutes an insertion filter. This creates an environmental advantage, since only the filtering component, which for example can be produced from paper, has to be discarded in connection with a filter-exchange.

In this connection, the term "filtering component" refers to the component, for example in the form of a filtering paper, that is arranged inside a sleeve-like filter protector and through which the contaminated medium is supplied. The term "filter unit" refers to the component that consists of the filtering component and the filter protector, which is adapted for mounting in the component in which the medium is used, for example for lubrication.

BRIEF DESCRIPTION OF THE DRAWINGS

The present invention will be described in detail in the following detailed description, which refers to the annexed drawing, which is a side, elevational, partial cross-sectional view of a device according to the present invention.

DETAILED DESCRIPTION

Figure 1:
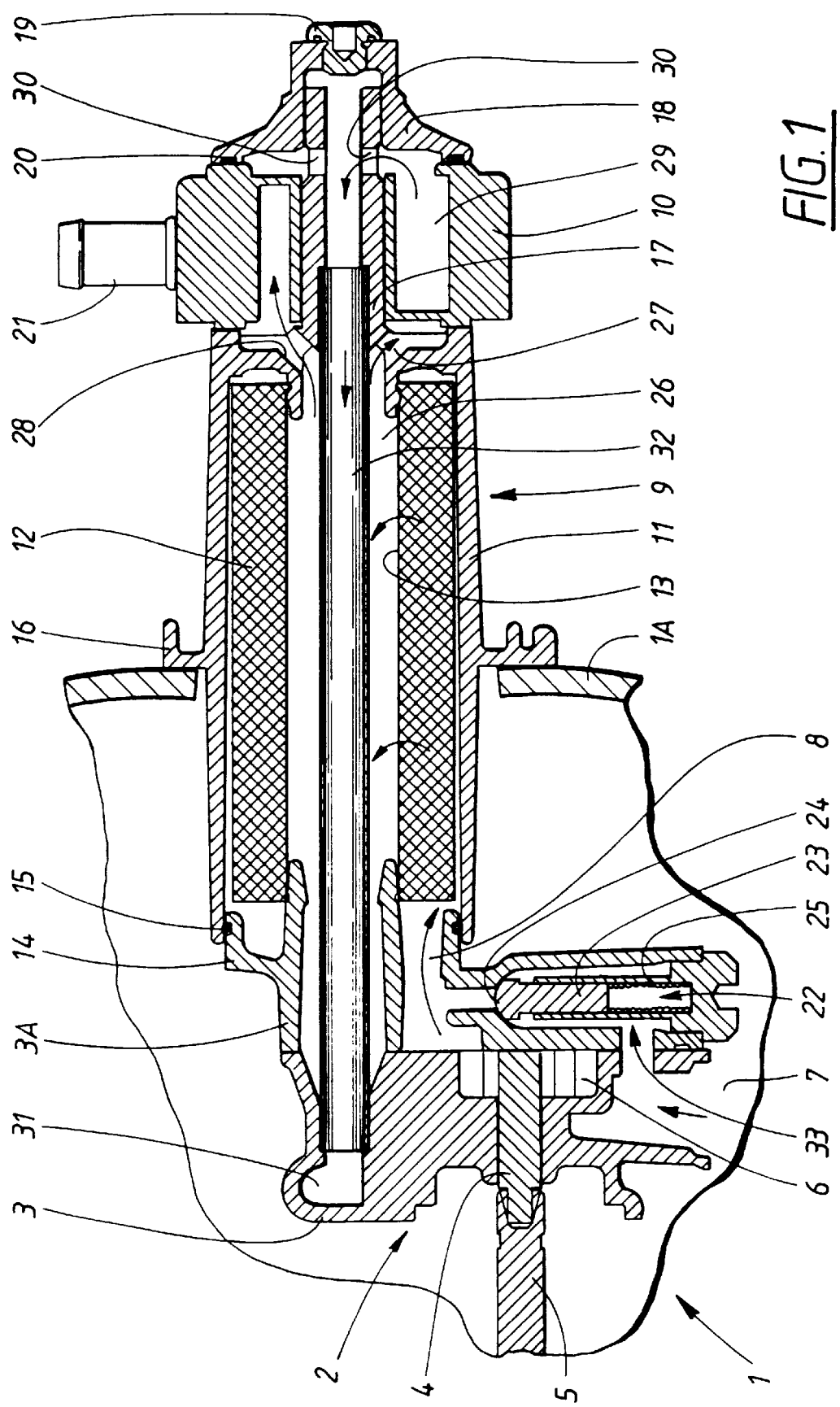

Turning to the drawing, FIG. 1 shows a cross-sectional view of a device according to the present invention, which, according to a preferred embodiment, constitutes a combined filter and cooling device for a liquid medium. The invention is primarily intended for use in connection with a motor vehicle, such as a heavy goods vehicle, for the filtration and cooling of oil in the vehicle gearbox. Thus, the drawing shows the casing 1A of the gearbox 1. An oil pump 2 is arranged in the interior of the gearbox, by means of which oil can be supplied from the oil pump to the device according to the present invention. The oil is used for lubrication of components forming part of the gearbox, such lubrication being carried out in a manner which is previously known and therefore will not be described here in detail.

The oil pump comprises a pump body 3, a pump cover 3A and a pump axle 4, which is rotatably arranged in the pump body 3. In a known manner, the pump axle 4 is driven by being connected to a driving axle 5, which in turn is driven by an axle in the gearbox and ultimately by the vehicle motor (not shown). Also, the oil pump 2 contains a pump element in the form of a gear wheel 6, which is arranged on a pump axle 4 and which also drives a ring-shaped gear wheel. Many other types of pumps are possible. The oil is supplied through an inlet 7 and pumped by means of the oil pump 2 in the direction of chamber 8 arranged downstream of the pump element 6.

The device according to the present invention contains two main components, namely a filter unit in the form of an oil filter 9 and an oil cooler 10. For mounting of these components on a gearbox, the casing 1A is designed so that it forms an opening. The filter unit 9 is designed having an essentially tubular filter protector 11 which supports a similarly tubular filtering component 12 which is constructed of a filtering material, preferably filtering paper which in a known manner is designed for the separation of particles that are present in percolating, contaminated oil. The filtering component 12 is inwardly delimited by a stay tube 13 which is preferably composed of a perforated tube, which can, for example, be made of plastic or steel and is utilized to fix the filtering component in its intended form.

Furthermore, the end of the filter protector 11 that faces towards the gearbox, is designed as a sleeve, the shape of which corresponds to a circular edge 14 on the pump cover 3A. Also, a circular seal 15 is arranged between the end part of the filter protector 11 and edge 14. Furthermore the filter protector 11 is designed with a peripheral flange 16, which is intended to bear against the outside of the casing 1A when the filter and the cooling device according to the present invention is in its mounting position.

The oil cooler 10 according to the present invention is arranged at the end of the filter protector 11 which is not facing towards the gearbox 1. For this reason, this end of the filter protector 11 is designed having a protruding part in the form of a tubular support sleeve 17, which extends through the oil cooler 10. As is apparent from the drawing, the support sleeve 17 is hollow. The outermost end portion of the support sleeve 17 is provided with threads, which cooperate with a nut 18, which thus may be used to screw the oil cooler 18 together with the filter unit 9. Outermost at the nut 18, a plug 19 is arranged. Furthermore, a seal 20 is arranged between the nut 18 and the oil cooler 10.

The oil cooler is previously known and comprises a fine-meshed net of channels (not shown), through which a cooling medium, preferably water, can be supplied. For the supply of this cooling medium, the oil cooler 10 is provided with a connection 21, which constitutes an inlet for feeding the cooling medium into the oil cooler. This connection 21 is connected to a (not shown) cooling water container or coolant supply, which is arranged in connection with the gearbox. The oil cooler 10 also contains an additional (not shown) connection, which constitutes an outlet for feeding the cooling water out of the oil cooler 10 and back into the water container or the coolant supply.

By means of the pump 2, the oil that is utilized to lubricate the gearbox is fed from the inlet 7 towards the chamber 8. When the pump 2 is in operation, there is a risk of an abnormally high pressure in the chamber 8. This may, for example, be the case during cold starts, when the oil is still cold and thus viscous. When the pressures in the chamber 8 are too high, there is a risk that damage may occur to the pump 2. In order to reduce the risk of such damage, an overflow valve 22 is arranged in connection with the pump 2. The valve 22 comprises a valve piston 23 which is movable in its longitudinal direction and which, in its natural state, blocks an opening 24 which connects the chamber 8 with the oil inlet 7. By means of a spring element 25, the valve piston 23 is biased to assume this state. The valve 22 is adapted so that it opens, i.e. is removed, at a predetermined pressure, for example 4 bar, whereby the opening 24 is no longer blocked. This results in the oil in the chamber 8 being guided back to the inlet 7 through channel 33, which in turn results in the oil being rapidly warmed up, due to the fact that the oil is pumped around in this manner. By means of the increase in the oil temperature, the flowability of the oil also increases. The predetermined pressure, at which the valve piston 23 exposes the opening 24, can preferably be adjusted by means of the choice of spring element 25.

The filtration and cooling of oil according to the present invention will now be described with reference to the drawing. Oil having a normal pressure, and which is fed in through the chamber 8, will be guided into the filter unit 9. Here, the oil will pass through the filtering component 12, which collects particles and other contaminants in the oil. The oil which is filtered in this manner will pass out towards an essentially tubular cavity 26 in the interior of the filtering component 12. Here, the oil is fed in the direction indicated by the arrows in the drawings.

The filtered oil, which has thus passed through the oil-filtering component 12, is further fed in the direction of the end of the cavity 26 that is farthest from the gearbox. Due to the fact that the filter protector 11 is provided with at least one, though preferably two or more, bored-out channels 27 and 28 which connect the filter protector 11 with the oil cooler 10, the oil will be fed into the oil cooler 10. Furthermore, the oil cooler 10 is designed with an essentially ring-shaped chamber 29 into which the oil is fed. The chamber 29 is arranged around the support sleeve 17 of the filter protector 11. Furthermore, the part of the oil cooler 10 which is arranged downstream is designed so that the oil is guided towards the support sleeve 17, which is provided with at least one, though preferably with a plurality, of openings 30 which allow oil to pass towards the interior of the support sleeve 17, as indicated by an arrow in the drawing.

The interior of the support sleeve 17 is connected to an outlet 31 for oil, i.e. an outlet which guides the oil back into the gearbox and towards its different points of lubrication. The connection between the interior of the support sleeve 17 and the outlet 31 comprises a separate connection component in the form of an elongated tube 32. The tube 32, which preferably has a circular cross-section, is mounted so that one of its ends is arranged inside the support sleeve 17 and the other end is arranged in the pump body 3, whereupon a tight connection is obtained between the tube 32 and the interior of the support sleeve 17, and between the tube 32 and the outlet 31, respectively. It is apparent from the drawing that the tube 32 extends through the inner cavity 26 inside the filtering component 12.

By means of the present invention, the filtered oil that is present in the cavity 26 will be forced against the oil cooler 10 through the holes 27 and 28, in which oil cooler the oil is cooled down. Furthermore, the oil is fed through the holes 30 into the interior of the support sleeve 17 and further into the tube 32. In this manner, the oil will be guided through the tube 32 and towards the outlet 31, whereupon the oil is guided further through the gearbox in a manner, which is not shown.

Due to the fact that the oil cooler 10 is arranged downstream of the filtering component 12, the entire amount of oil will first be filtered, and then cooled down. This results in the oil which is filtered being warm, which results in an improved flow through the oil-filtering component. Furthermore, contaminants will be separated from the oil before the oil reaches the oil cooler 10, which reduces the risk of the oil cooler being blocked due to accumulation of particles.

Since the filter unit 9 primarily only contains the filtering component 12 and the filter protector 11, the filter unit also can be made environmentally advantageous. During exchange of an oil filter in a vehicle, the oil cooler 10 is initially removed, whereupon the filter protector 11 is removed from its place in the gearbox casing 1A. Thereafter, the filtering component 12, which, for example, is composed of filtering paper, is removed and discarded. This will result in a minimum of ecologically harmful waste.

The present invention is not limited to the embodiment, which is described above, but may be varied within the scope of the appended claims. For example, the invention may be utilized in different types of vehicles, and in principle also in applications which are not related to vehicles, but where it is desirable to filter and cool of a liquid medium intended for a lubricated component.

Furthermore, the present invention may be constructed so that the cavity, through which the oil is fed before it reaches the oil cooler 10, can be arranged inside as well as outside the filtering component 12, provided that the oil from the cooling device is fed to the outlet 31 through the cavity by means of a connection element.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the treatment of a liquid lubricant in a supply of said lubricant comprising a filter housing having a first side and a second side, said filter housing adapted for mounting proximate to said supply of said lubricant, a filtering component having a first side and a second side, said filtering component mounted within said filter housing, an inlet for supplying said lubricant from said supply of said lubricant to said first side of said filtering component, whereby said lubricant can pass through said filtering component to said second side of said filtering component, said second side of said filter housing comprising a cavity, a lubricant cooler disposed downstream of said cavity, said lubricant cooler adapted for mounting on said filter housing distal from said supply of said lubricant, whereby said lubricant can pass from said cavity through said lubricant cooler for cooling therein, an outlet for said treated lubricant, and a connector for transporting said lubricant from said lubricant cooler to said outlet, said connector being disposed within said cavity.

2. The apparatus of claim 1 wherein said connector comprises a detachable tube.

3. The apparatus of claim 1 said filter housing including at least one aperture for passing said lubricant from said filter to said lubricant cooler.

4. The apparatus of claim 3 wherein said filter housing includes a tubular portion extending into said lubricant cooler, said tubular portion including at least one aperture whereby said cooled lubricant can pass from said lubricant cooler into said tubular portion.

5. The apparatus of claim 4 wherein said connector is detachably mounted within said tubular portion and at said outlet.

6. The apparatus of claim 3 wherein said filtering component is removably mounted within said filter housing.

7. The apparatus of claim 1 wherein said supply of lubricant includes a lubricant pump for pumping said lubricant to said inlet, said inlet including a passageway and a normally closed valve for selectively opening said passageway, whereby said normally closed valve is selectively opened when the pressure in said inlet exceeds a predetermined value.

8. The apparatus of claim 7 wherein said passageway is in fluid communication with said supply of said lubricant.

9. A gear box for a vehicle comprising the apparatus of claim 1, said liquid lubricant comprising oil flowing in said gear box.

10. Apparatus for the filtration and cooling of a liquid lubricant used to lubricate a component within a casing having an opening therein comprising:

a filter housing having a first end proximate to said casing and a second end distal from said casing, said filter housing having at least one channel therethrough, a portion of said first end of said filter housing extending within said opening of said casing, and a filtering component arranged within said filter housing;

a cooler mounted on said second end of said filter housing, whereby said lubricant flows from said first end of said filter housing through said channel, and into said cooler; and a connector in fluid communication with said cooler and said casing for returning said oil from said cooler to said casing.

11. The apparatus of claim 10, wherein said filter housing is designed in the shape of a sleeve, the shape of said first end of said sleeve corresponding to the shape of an edge of said component located within said casing, and further including a seal disposed between said first end of said filter housing and said edge of said component.

12. The apparatus of claim 10, wherein said filter component is removably mounted within said filter housing.

* * * * *